United States Patent
Williams et al.

(10) Patent No.: US 10,089,895 B2
(45) Date of Patent: *Oct. 2, 2018

(54) SITUATED SIMULATION FOR TRAINING, EDUCATION, AND THERAPY

(71) Applicant: CASE WESTERN RESERVE UNIVERSITY, Cleveland, OH (US)

(72) Inventors: Stacy L. Williams, Bay Village, OH (US); Marc Buchner, Beachwood, OH (US)

(73) Assignee: Case Western Reserve University, Cleveland, OH (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/540,339

(22) Filed: Nov. 13, 2014

(65) Prior Publication Data
US 2015/0072322 A1    Mar. 12, 2015

Related U.S. Application Data

(62) Division of application No. 12/520,897, filed as application No. PCT/US2007/026247 on Dec. 21, 2007.

(Continued)

(51) Int. Cl.
*G09B 5/06* (2006.01)
*G09B 7/02* (2006.01)
(Continued)

(52) U.S. Cl.
CPC .............. *G09B 5/065* (2013.01); *G09B 7/02* (2013.01); *G09B 19/04* (2013.01); *G10L 25/48* (2013.01)

(58) Field of Classification Search
CPC .......... A61B 5/165; A61B 5/167; A61B 5/168
(Continued)

(56) References Cited

U.S. PATENT DOCUMENTS 5,896,139 A    4/1999  Strauss
5,913,310 A *  6/1999  Brown .................. A61B 90/00
                                                128/897

(Continued)

OTHER PUBLICATIONS

Stacy L Williams; The Virtual Immersion Center for Simulation Research: Interactive Simulation Technology for Communication Disorders; 2006, pp. 124-128, Presence 2006.

(Continued)

*Primary Examiner* — Robert J Utama
*Assistant Examiner* — Sadaruz Zaman
(74) *Attorney, Agent, or Firm* — Taft Stettinius & Hollister LLP

(57) ABSTRACT

Systems, methods, and other embodiments associated with producing an immersive training content module (ITCM) are described. One example system includes a capture logic to acquire information from which the ITCM may be produced. An ITCM may include a set of nodes, a set of measures, a logic to control transitions between nodes during a training session, and a logic to establish values for measures during the training sessions. Therefore, the example system may also include an assessment definition logic to define a set of measures to be included in the ITCM and an interaction logic to define a set of interactions to be included in the ITCM. The ITCM may be written to a computer-readable medium.

15 Claims, 7 Drawing Sheets

Related U.S. Application Data

(60) Provisional application No. 60/877,268, filed on Dec. 27, 2006.

(51) Int. Cl.
   *G10L 25/48* (2013.01)
   *G09B 19/04* (2006.01)

(58) Field of Classification Search
   USPC .................................................. 434/185, 156
   See application file for complete search history.

(56) References Cited

U.S. PATENT DOCUMENTS

| | | | |
|---|---|---|---|
| 6,055,498 A | 4/2000 | Neumeyer et al. | |
| 6,186,145 B1 * | 2/2001 | Brown | A63F 13/005 |
| | | | 128/897 |
| 6,230,121 B1 | 5/2001 | Weber | |
| 6,234,802 B1 * | 5/2001 | Pella | G09B 5/065 |
| | | | 434/156 |
| 6,418,424 B1 | 7/2002 | Hoffberg et al. | |
| 6,425,764 B1 * | 7/2002 | Lamson | A61M 21/00 |
| | | | 434/236 |
| 6,722,989 B1 * | 4/2004 | Hayashi | A63F 13/10 |
| | | | 434/167 |
| 6,736,642 B2 | 5/2004 | Bajer et al. | |
| 7,128,577 B2 * | 10/2006 | Renaud | G06F 3/016 |
| | | | 434/236 |
| 7,676,372 B1 | 3/2010 | Oba | |
| 7,853,626 B2 * | 12/2010 | Jung | G06F 19/326 |
| | | | 707/812 |
| 7,946,974 B2 * | 5/2011 | Lordereau | A61M 21/00 |
| | | | 128/897 |
| 8,062,129 B2 * | 11/2011 | Pope | A63F 13/06 |
| | | | 463/31 |
| 2005/0095569 A1 | 5/2005 | Franklin | |
| 2005/0131924 A1 | 6/2005 | Jones | |
| 2005/0283053 A1 * | 12/2005 | deCharms | A61B 5/055 |
| | | | 600/300 |
| 2006/0073454 A1 * | 4/2006 | Hyltander | G09B 23/285 |
| | | | 434/262 |
| 2007/0066403 A1 * | 3/2007 | Conkwright | A63F 13/10 |
| | | | 463/43 |

OTHER PUBLICATIONS

UK Intellectual Property Office, Notification of Grant for UK Patent Serial No. GB2458054 on Jun. 8, 2011 in related UK application; notification date of May 10, 2011.

Australian Government Patent Office, Examiner's Report dated Jul. 12, 2011 for AU Application No. 2007342471 in related AU application.

Bernhard Jung et al., The Affective Virtual Patient: An E-Learning Tool for Social Interaction Traning Within the Medical Field; Proceeding TESI 2005 Training Education and Education International Conference, Nexus Media, 2005, pp. 1-9.

UK Intellectual Property Office, Examination Report dated Nov. 8, 2010 for UK Patent Serial No. GB2458054 in related UK application.

* cited by examiner

SITUATED SIMULATION FOR TRAINING, EDUCATION, AND THERAPY

CROSS REFERENCE TO RELATED APPLICATIONS

This application claims the benefit of U.S. Provisional Application No. 60/877,268 filed Dec. 27, 2006, titled Situated Learning Simulation and is a divisional application of U.S. patent application Ser. No. 12/520,897, which is a National Stage entry of PCT/US2007/026247.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Speech therapy has typically involved interactive real time adaptive human to human interaction. Similarly, much teaching and training has historically involved interactive real time adaptive human to human interactions. As computers, video systems, audio systems, and other technology have advanced, more and more of these technologies have been brought to bear on teaching and training. This patent application describes how certain technologies have been applied in speech therapy. Though the description focuses on speech therapy, one skilled in the art will appreciate the relevance to other applications including training.

Technology has been applied in related fields. For example, flight simulators (sims) have become increasingly sophisticated. These sims place a human in different scenarios and may be pre-constructed to evaluate responses to certain conditions. Sims may also be used to train pilots how to react to certain situations. Thus, sims represent a class of real time adaptive applications. Some sims may even accept physiological bio-feedback from pilots being trained. This bio-feedback may be employed for analysis and/or to customize a sim scenario on the fly. Physiological bio-feedback may be employed more frequently in athletic training sims.

While these sims have provided invaluable training on a broad scale, training that might not otherwise have been available, this training has typically been limited to interactions between humans (e.g., pilots) and machines (e.g., airplanes) operating in the physical world.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

DETAILED DESCRIPTION

Figure 1:
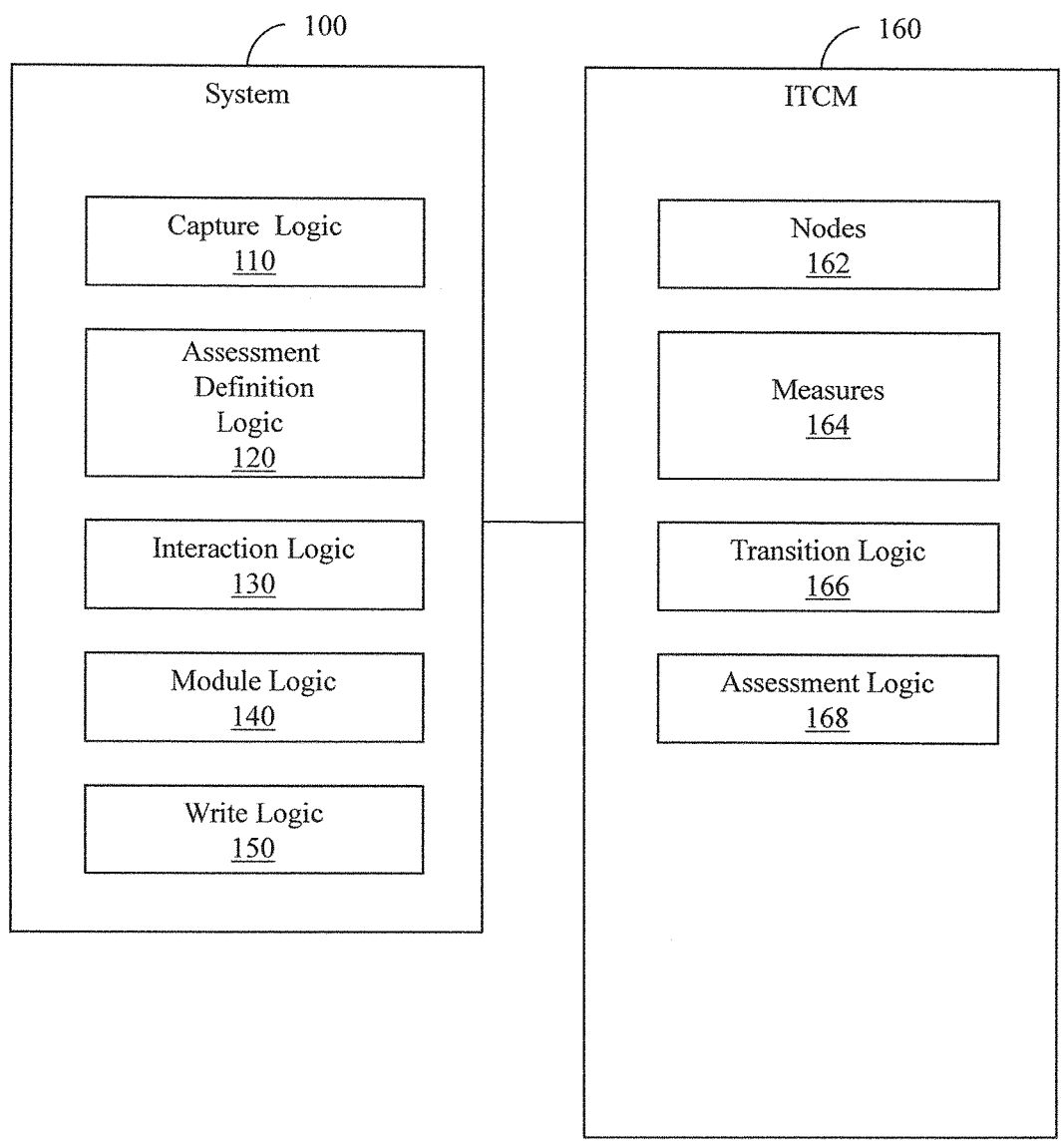
FIG. 1 illustrates an example system employed in an integrated content creation environment (ICCE).

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

XML refers to extensible markup language. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discreet logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Real time adaptive interactive automated speech therapy represents an advance over conventional speech therapy in that human to human interactions may now be simulated through the use of computer technology. Much training, speech therapy included, relies on placing a patient/student in a scenario where skills can be evaluated and exercised. This application describes example systems and methods associated with preparing an immersive training content module (ITCM), using an ITCM, and adapting, in real-time, a training session associated with an ITCM during a training session and/or between training sessions. In one example the adapting can be based on physiological and/or behavioral non-verbal bio-feedback received from a patient/student during a session. In another example, the adapting can be based on evaluation of performance during a session(s) and/or between sessions. In different examples the performance evaluation may be based on operator (e.g., therapist) and/or automated (e.g., AI) signals.

A training session may be presented, for example, as an interactive virtual experience. A patient/student may be presented with the interactive virtual experience in different environments. For example, a patient/student may enter a theatre-like environment, may enter a virtual reality (vr) environment (e.g., VR headset, VR glasses), and so on. The interactive virtual experience may include interactive branch points, points at which the experience may progress in different directions based on decisions made by the patient/student, based on patient/student performance, based on therapist decisions, based on bio-feedback, and so on. Thus, the interactive virtual experience is not like a movie watched on television that has a fixed starting point, a fixed ending point, and a fixed path between these two points. Instead, the interactive virtual experience may traverse a set of interactions arranged in, for example, a graph. The above-described decisions, feedback, and so on, may determine transitions between elements (e.g., nodes) in the graph.

A learning and/or therapy session may be profoundly affected by a number of factors. These factors include immersion, realism, distractions, stressors, complexity, comfort, and so on. Immersion concerns a patient/student temporarily disengaging from their actual surroundings (e.g., classroom, theatre, VR environment) and engaging with, for example, an interactive experience. Immersion may be affected by many factors. One such factor is the continuity that is achieved between interactions in a training session. For example, in a first interaction, a patient/student may approach a virtual counter at a virtual fast food restaurant. A virtual server may greet the patient/student and ask a question. The next interaction presented may depend on the patient/student performance in the interaction. After an operator and/or an artificial intelligence (AI) logic evaluate the patient/student performance, the next interaction may be selected and the virtual server controlled to perform that interaction.

An interactive experience may include more than just an actor delivering lines. An interactive experience may also include a setting (e.g., environment) in which the virtual actor may be placed. The set may represent settings for which a patient may receive speech therapy. These settings may include, for example, business settings, social settings, educational settings, emergency settings (e.g., calling 911), and so on. The set may represent settings for which a student may receive training. These settings may include, for example, higher education training programs (e.g., medicine, law, language, social work, allied health professions), hostage negotiations, receiving 911 calls, handling customer complaints, questioning a witness, and so on.

The set may be characterized by sights, sounds, smells, temperatures, orientations, stabilities (e.g., bumpy boat ride) and so on. Thus, producing an ITCM may include acquiring actual observed data from a setting. The acquisition may include video, audio, environmental (e.g., temperature, smell, motion) and so on. However, not all of this data may be relevant and/or useful to a training and/or therapy environment. Thus, producing an ITCM may include identifying and extracting relevant data from the collected observed data. The identifying and/or extracting may be automated and may be based on criteria including frequency, response, degree of distraction, and so on. For example, a frequency based extraction decision may turn on identifying data that occurs frequently enough to be considered part of a setting but not so frequently that it would typically be ignored. A response based extraction decision may turn on what response there was to the observed behavior.

Producing an ITCM for speech therapy and/or training may include capturing meaningful phrases, distractions, pacings, gestures, and so on from environments and/or actors with which the patient/student may interact. With this data available, and with the audio and/or video captured from an actor, real or computer-generated, an interactive experience can then be constructed from a set of interactions. Example systems and methods describe how the interactive experience may be produced, used, and/or adapted in real time.

Real time adaptation of an interactive experience may be based on signal processing of acquired feedback. The signal processing may characterize a state(s) of the patient/student with respect to factors including immersion, training zone, performance, and so on. The acquired feedback may include data corresponding to various physiological and/or behavioral ((non)verbal) bio-feedback measures.

Interactive experience attributes that may be adapted may include distractions, stressors, and complexity. Distractions may include audio distractions (e.g., sirens, people talking, phones ringing, baby crying), visual distractions (e.g., individual movements, group movements, apparatus movement, shadows, birds flying by), olfactory distractions (food smells, environment smells), and so on. For example, a default version of an interaction may not include a phone ringing. However, based on feedback (e.g., bio-feedback, responses) acquired during a training session, an automatic determination may be made to add a ringing telephone for a certain patient/student in a certain training session to increase immersive levels. Stressors may include temporal stressors (e.g., wait time, urgency time, time to respond), audible stressors (e.g., tone of VR voice, tone of voice of surrounding people, tone of voice of next person in line, signal to noise ratio for crowd noise), visual stressors (e.g., facial expressions, non-verbal social cues), and so on. Complexity may involve, for example, adding multiple distractors and/or stressors simultaneously and/or in serial, the number of words/syllables in a question/statement from a VR actor, language intensity (words used that deviate from neutral), non-verbal and external additions from the VR actor (e.g., construction sounds paired with VR actor response) and so on.

Additional factors that may be adapted in a training session include, for example, volume, pace, proximity of actor, zoom level of actor, number of screens on which movie is presented, dimensionality of movie as presented, and so on. Additionally, the character with which the patient/student is interacting can be adapted to take on attributes that make the character more or less life-like, more or less threatening, more or less agitated, and so on. For example, a therapy session may begin with the patient/student interacting with a virtual character presented as a known, friendly, non-threatening entity. As the therapy session continues, the virtual character may take on more threatening attributes (e.g., flaring nostrils, set jaw, tone of voice). In one example, the virtual character may begin as a complete animation of a known friendly cartoon character and as the therapy session continues the virtual character may be transformed into a representation of a true human with real, everyday characteristics. The rate at which a transformation occurs may depend on feedback acquired during the session. These transitions may be made to evaluate a patient/student when presented with different degrees of stress. These transitions may also be made to place the patient/student into a desired training zone defined, for example, by values associated with various bio-feedback and/or therapist identified feedback.

Feedback upon which adaptations can be made may include, for example, heart rate, skin temperature electro cardiogram (EKG) readings, electro encephalogram (EEG) readings, pupil dilation, eye contact, facial expressions (none, slight, full, laughter), posture, gestures, therapist impression, speech performance, and so on. Times at which this feedback may be collected and thus times at which adaptations may occur include, for example, while immersion is being achieved, during baseline testing, during therapy session, during subsequent testing, and so on. For example, a patient/student may enter a therapy environment, have baseline testing of certain attributes (e.g., heart rate, skin conductance) and then adaptations may be made based on patient/student physiological changes during therapy. For example, a constant heart rate may indicate that a patient/student is comfortable with the amount, type, and degree of distractions and/or stressors occurring during a therapy session. Thus, the amount, type, and/or degree of distractions and/or stressors may be increased to determine the effect, if any, on the comfort of the patient/student as reflected by heart rate. This can facilitate evaluating overall session performance, improvements over sessions, and so on. As described, acquiring some bio-feedback may require more intrusive apparatus (e.g., heart rate monitor) while acquiring other feedback may require less intrusive apparatus (e.g., pupil dilation monitor, gesture tracker, posture tracker).

One feedback upon which adaptations and/or other decisions may be made is automated speech performance analysis. This type of analysis may also require baseline acquisitions to facilitate identifying subsequent deviations. Automated speech performance analysis may include studying several speech parameters. Parameters studied may include, for example, articulatory movements, articulatory precision, slurring, stuttering (primary and secondary characteristics), voice modulation/resonance, pacing, and so on. Analyzing articulatory movements and/or articulatory precision may involve analyzing the presence or absence of specific sound features and characteristics. Analyzing slurring may involve analyzing the presence or absence of certain desired intelligible sounds (e.g., t, d, ch). Analyzing primary stuttering may involve analyzing repetition of isolated sounds, phrases, and discourse (e.g., d-d-d, b-b-b-b) within a specified time frame without appropriate intervening sounds (e.g., d-d-dog vs. dog, b-b-baby vs. baby). Analyzing secondary stuttering characteristics may involve analyzing speech musculature or phonatory behaviors that lead to discontinuities beyond a threshold period of time without a terminating inflection and with glottal catch as well as habitual use of other body parts that one who stutters may employ to modify dysfluencies. Analyzing modulation may involve analyzing consistency of tone and/or volume with appropriate inflection changes. Analyzing pacing may involve analyzing changes in pacing (e.g., increases, decreases) and relating these changes to situational parameters (e.g., urgency, distractions, stressors). This analyzing may be automated and may be based on comparing a current performance to a baseline or previous performance.

The data against which a current performance may be measured may include a score assigned to the parameters described above (e.g., articulatory movements, articulatory precision, slurring, stuttering (primary and secondary characteristics) voice modulation, voice resonance, pacing, and so on. Scores may also be assigned for discourse characteristics. Data may also be acquired for various physiological and behavioral bio-feedback attributes. These scores and data may then be stored on a per patient/student basis to facilitate later comparison. In one example, the data against which comparisons can be made may be acquired using fully automated analysis which uses, for example, a fully trained up pattern matcher to compare baseline performance data to current patient/student performance data. In another example, data against which comparisons can be made may be acquired using a partially automated analysis that includes a therapist providing indications of a slur, stutter, or block for a patient/student utterance. This indication may be provided to an AI logic that is being trained up and may also be provided to a scoring logic. For example, a back propagation neural network may be trained up for individual patients. The therapist may provide information to an AI logic during the training of the back propagation neural network.

Similarly, during a session, either a trained up AI logic and/or a therapist may score speech performance. The score may be compared to previously recorded scores and manipulations may be made based on the comparison. For example, a session, scene, and/or actor may be adapted based on a score being constant, better, or worse than a previous or desired score. Additionally, a therapy schedule may be adapted based on a score and/or a rate of change of scores. For example, it may be observed that a first patient's performance is improving at a desired rate and thus a therapy schedule may be maintained. However, it may be determined that a second patient's performance is not improving at a desired rate and thus additional therapy sessions may be scheduled. In another example, various therapy schedules may be tried, (e.g., one session per week, three sessions per week) and the rate of improvement may be monitored to determine an appropriate number of weekly sessions.

Moviemakers, video game creators, athletic coaches, and others have used motion suits to capture the motion of actors, athletes, performance artists, and so on. Movements have been captured to facilitate creating realistic games, to produce interesting special effects, to provide performance feedback, and so on. However, these applications have followed a traditional record and replay cycle, where data is acquired, data is processed, and then the processed data is used later to create an image.

In one example, a therapist, actor, or other person could wear a motion suit and/or audio capturing apparatus, from which real time data could be acquired. This data could be used to produce a real time computer generated animation (RTCGA) with which a patient/student could interact. In one example, the RTCGA may be referred to as a "character". The RTCGA could be placed into a computer rendered environment (e.g., set). Additionally, the RTCGA could be manipulated to achieve certain desired effects. For example, appearance (e.g., cartoon animation, friendly human, hybrid), volume, proximity, and so on could be manipulated. In this way, the patient/student may experience interactions with the RTCGA that may not be possible using only pre-recorded scenes. For example, a patient/student may be able to direct a RTCGA to interact with a per patient/student customized environment. By way of illustration, a patient/student may own a certain toy. The toy could be provided to the RTCGA as a prop whose position and motion can be tracked to simulate the location, orientation, and so on, of the toy. The party wearing the motion suit could then be directed by the patient/student to interact with the toy, a prop, or other object. In another example, the party wearing the motion suit could use the toy, prop, or other object to produce reactions from the patient/student. Frames and/or scenes involving these patient/student directed actions or actor initiated actions may then be added to pre-recorded scenes and made available for subsequent training and/or therapy.

Thus, a human in a motion suit could interact indirectly with a patient/student to provide data from which a RTCGA can be produced. The RTCGA can be placed into the virtual environment and manipulated in ways that a pre-recorded actor may also have been manipulated (e.g., volume, appearance, degree of animation, degree of friendliness).

One time at which adaptations can be made is during pre-therapy sessions where quantifiable indicia of change in immersion are analyzed on a per patient/student basis. Different patients may require different periods of time and/or different progressions of information to achieve immersion. Thus, pre-therapy sessions may involve identifying attributes, progressions, interactions, and time periods that facilitate a patient/student achieving immersion. This per patient/student information may then be stored for use during later therapy sessions. Acquiring and storing this information may facilitate optimizing the time spent in immersion during a therapy session.

FIG. 1 illustrates a system 100 that is employed in an integrated content creation environment (ICCE) to produce an ITCM 160. In one example, the ITCM 160 is associated with a real-time adaptive interactive speech therapy session. While speech therapy is described, it is to be appreciated that real-time adaptive interactive therapy may be employed in other environments including, for example physical therapy. System 100 includes a capture logic 110. Capture logic 110 is to acquire a set of information to be employed in producing ITCM 160. The information may come from a variety of sources (e.g., three dimensional computer animation generator, sound recording equipment, graphical user interface generator) and thus may take a variety of forms. For example, the information may include, but is not limited to, a real-time three-dimensional animation data, a video data, a digital image, a sound encoded in a pdf file, a sound encoded in an audio file, a sound encoded in a text file, a text, a tactile data, and an olfactory data. This information may facilitate producing an immersive virtual world into which a person involved in a training session associated with the ITCM 160 may enter. The immersive virtual world may be designed to facilitate certain speech patterns, certain physical movement patterns, and so on.

System 100 also includes an assessment definition logic 120. Assessment definition logic 120 defines a set of measures 164 to be included in the ITCM 160. In one example the ITCM 160 is associated with speech therapy. Thus, the set of measures 164 may be associated with evaluating speech and may include entries for an articulatory movement measure, an articulatory precision measure, a voice modulation measure, a voice resonance measure, a pacing measure, a stuttering measure, a slurring measure, a performance measure, a comprehension measure, and so on. While several entries are described, it is to be appreciated that the set of measures 164 may include a greater and/or lesser number of entries and may include different combinations of entries. Additionally, while speech therapy measures are described, it is to be appreciated that measures associated with other training (e.g., hostage negotiation) and/or therapy (e.g., occupational, physical) may be employed.

System 100 also includes an interaction logic 130. Interaction logic 130 defines a set of interactions to be included in the ITCM 160. The interactions may define a desired stimulus response sequence between a trainee in a training session and a character, object, event, and so on, associated with the training session. For example, an interaction may involve a verbal exchange between a trainee and a character. A character may be configured to ask a certain question and the training session is designed to exercise the trainee response to that question. While a verbal exchange is described, it is to be appreciated that other interactions may be employed. For example, in the physical therapy environment, the desired interaction may be moving a certain limb through a certain range of motion while attached to a weight machine. In the occupational therapy environment, the desired interaction may be touching a series of control buttons in a desired sequence within a desired time frame. One skilled in the art will appreciate that other interactions may be employed.

System 100 also includes a module logic 140 to produce the ITCM 160. The ITCM 160 may include elements based on the set of information, a set of measures 164, and on the set of interactions. The ITCM 160 may also include logic for processing the elements. Since the ITCM 160 may include both data and methods for processing the data, in one example the ITCM 160 may be implemented as an object, where the term "object" is used as its computer science (e.g., object-oriented) term of art.

The ITCM 160 may include a set of nodes 162 arranged in a graph. While a graph is described, it is to be appreciated that nodes may be logically arranged in other traversable configurations (e.g., tree). Members of the set of nodes 162 may store both content and logic for processing that content. The content may include, for example, data describing a character to be presented during a training session, a setting in which the character is to be presented, video to be presented during a training session, audio to be presented during a training session, a digital image, an interaction involving the character, a set of node-level measures, and so on. While several types of content are described, it is to be appreciated that a node may include a greater and/or lesser amount of content. A node may also include logic for processing the content and/or for processing data associated with a training session. Thus, the logic in a node may acquire interaction data, may populate members of the set of node-level measures based on the assessment data, and so on.

The set of nodes 162 is arranged in a traversable arrangement. Therefore, the ITCM 160 may include a transition logic 166 to transition between members of the set of nodes 162 during a training session. Transitions between nodes are not made in a vacuum and therefore ITCM 160 may include logic to acquire data during a session so that informed decisions concerning transitions can be made. In one example the data may include interaction data. The interaction data may be, for example, a response, a response time associated with acquiring the response, and so on. The interaction data may be evaluated. In one example the interaction data may be evaluated by a human (e.g., operator, therapist). Thus, in one example, values for members of the set of measures 164 may be determined based on data acquired during a training session and human interpretation and/or evaluation of that data.

The data acquired during a training session may be provided to an assessment logic 168 that may provide values for members of the set of measures 164. The transition logic 166 may then make determinations concerning nodes to visit based on the values of the members of the set of measures 164.

System 100 also includes a write logic 150 to store the ITCM 160 in a computer-readable medium. In one example, write logic 150 may write an object to a computer memory. In another example, write logic 150 may populate portions of an XML file stored on disk with descriptions and instances of data associated with ITCM 160.

Figure 2:
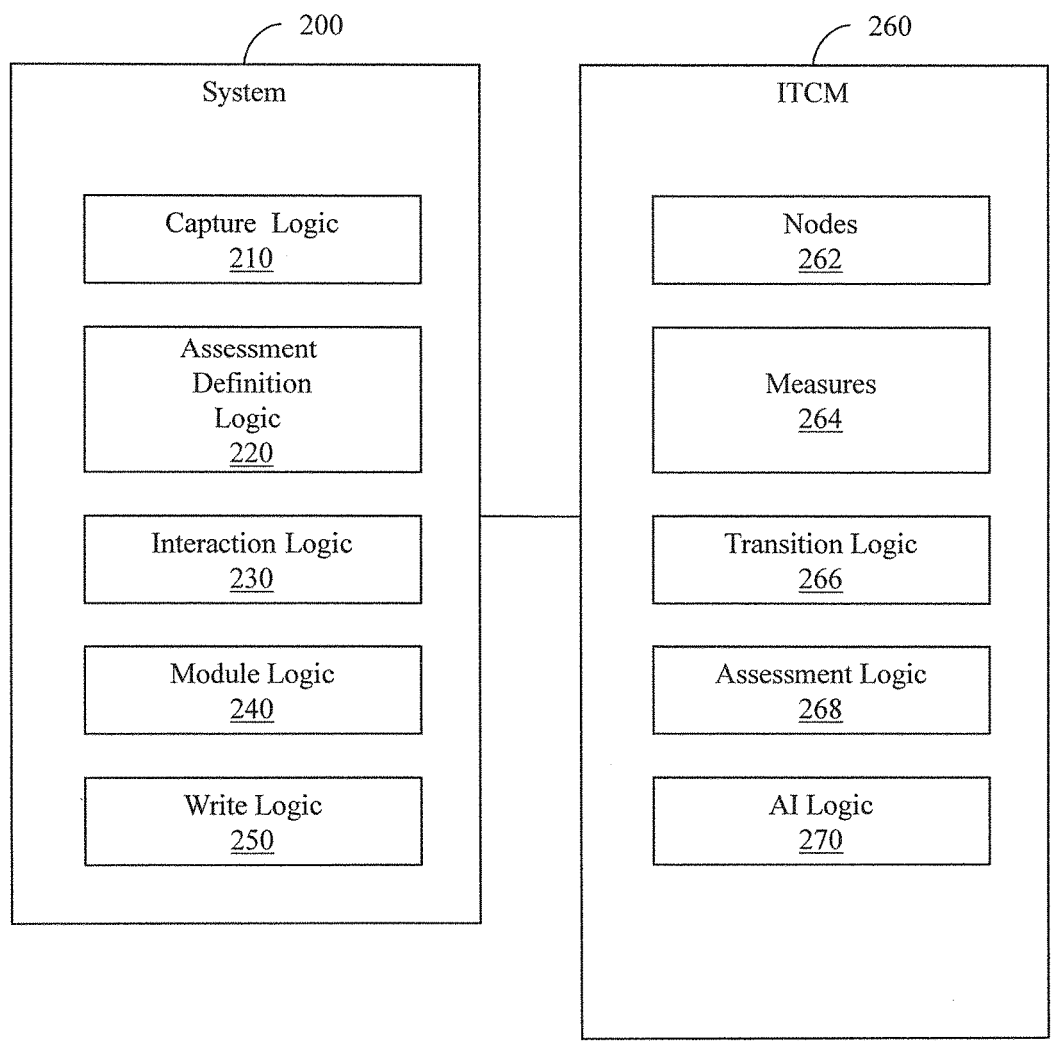
FIG. 2 illustrates another example system employed in an ICCE.

FIG. 2 illustrates a system 200 having elements similar to those disclosed in connection with system 100 (FIG. 1). For example, system 200 includes a capture logic 210, an assessment definition logic 220, an interaction logic 230, a module logic 240, and a write logic 250. Module logic 240 may be configured to produce an ITCM 260 having elements similar to those associated with ITCM 160 (FIG. 100) (e.g., set of nodes 262, set of measures 264, transition logic 266, assessment logic 268) but also including an additional element. For example, ITCM 260 includes an artificial intelligence (AI) logic 270. AI logic 270 evaluates training session data acquired during a training session. In one example, AI logic 270 is a back propagation neural network.

In one example, the ITCM 260 acquires assessment data from an operator and/or from the AI logic 270. In this example, the assessment logic 268 is to determine a value for a member of the set of measures 264 based on an operator signal, an AI signal provided by the AI logic 270, the operator signal as modified by the AI logic 270, and/or on the AI signal as modified by the operator. While four possibilities are described, it is to be appreciated that a different combination of signal processing may be employed. In different examples, the AI logic 270 may be trained generally to evaluate information with respect to a population and/or may be trained to evaluate information with respect to an individual. Thus, in one example, the AI logic 270 may include persistent memory to facilitate evaluating data over a number of training sessions.

With AI logic 270 available, the transition logic 266 may select a member of the set of nodes 262 to visit based on signals from a human and/or the AI logic 270. For example, the transition logic 266 may make a selection based on an operator signal, an AI signal provided by the AI logic 270, the operator signal as modified by the AI logic 270, and the AI signal as modified by the operator. Thus, in different examples, transitions between members of the set of nodes 262 may be controlled manually, automatically, and/or using a combination of both.

Figure 3:
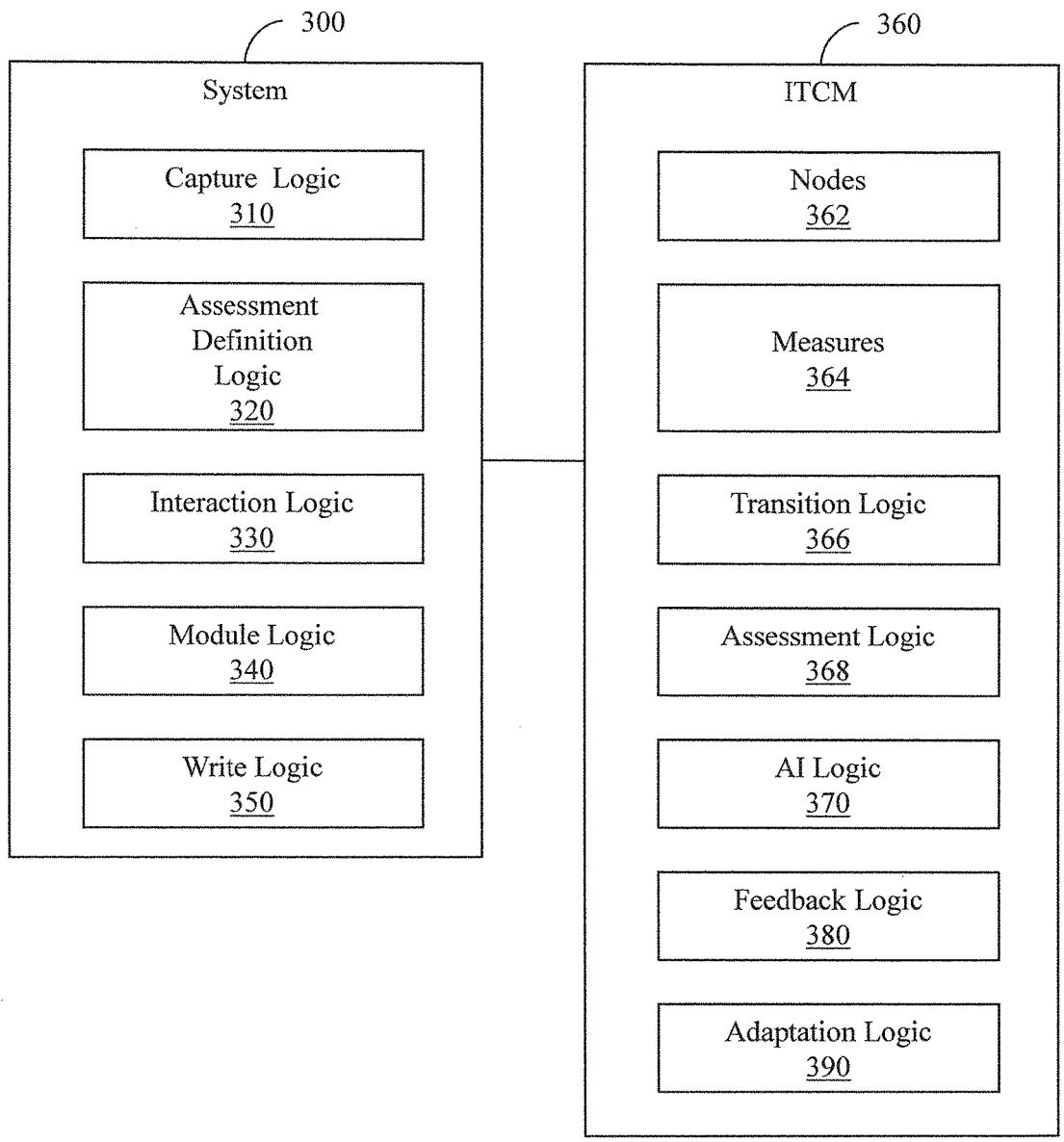
FIG. 3 illustrates another example system employed in an ICCE.

FIG. 3 illustrates a system 300 having elements similar to those disclosed in connection with system 200 (FIG. 2). For example, system 300 includes a capture logic 310, an assessment definition logic 320, an interaction logic 330, a module logic 340, and a write logic 350. Module logic 340 may be configured to produce an ITCM 360 having elements similar to those associated with ITCM 260 (FIG. 2) (e.g., set of nodes 362, set of measures 364, transition logic 366, assessment logic 368, AI logic 370) but also including additional elements. For example, ITCM 360 includes a feedback logic 380 and an adaptation logic 390.

Feedback logic 380 is to acquire a set of feedback data during a training session associated with the ITCM 360. In the speech therapy environment the set of feedback data may include, for example, heart rate data, skin temperature data, galvanic skin response (GSR) data, electro-cardiogram (EKG) data, electro-encephalogram (EEG) data, pupil dilation data, eye contact data, facial expression data, posture data, gestural data, intonation data, therapist impression data, and speech performance data. With this rich set of feedback data available, adaptation logic 390 may automatically adapt, in real-time, a speech therapy training session based on the set of feedback data and/or on operator inputs and/or inputs from AI logic 370. For example, the adaptation logic 390 may determine an adaptation to be made to the training session based on an operator signal, on an AI signal provided by the AI logic 370 and/or on a combination thereof. These signals may be related to decisions based on physiological bio-feedback, behavioral non-verbal bio-feedback, performance evaluation, and so on.

The adaptation logic 390 may determine to adapt different aspects of a speech therapy training session. For example, the adaptation logic 390 may determine to adapt a number of distractions in a training session, a type of distraction in a training session, a number of stressors in a training session, a type of stressor in a training session, a complexity associated with a training session, a volume associated with a training session, a pace associated with a training session, a proximity of a character associated with a training session, a degree of friendliness of a character associated with a training session, a degree of animation of a character associated with a training session, and so on. While a number of different aspects to adapt are identified, it is to be appreciated that a greater and/or lesser number of aspects may be adapted and that the aspects may be adapted in different orders and/or combinations.

While feedback logic 380 was described processing feedback data associated with a speech therapy session and while adaptation logic 390 was described adapting parameters associated with a speech therapy session, it is to be appreciated that an ITCM 360 may be employed in different training and/or therapy environments. For example, in a physical therapy environment the feedback logic 380 may acquire information describing the accuracy with which a desired exercise performed and physiological data acquired during the exercise. In this example, adaptation logic 390 may change parameters like the amount of weight being moved during an exercise, the range of motion for an exercise, and so on. One skilled in the art will appreciate that different sets of feedback and different sets of adaptations may be acquired and performed in different environments in which ITCM 360 may operate.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
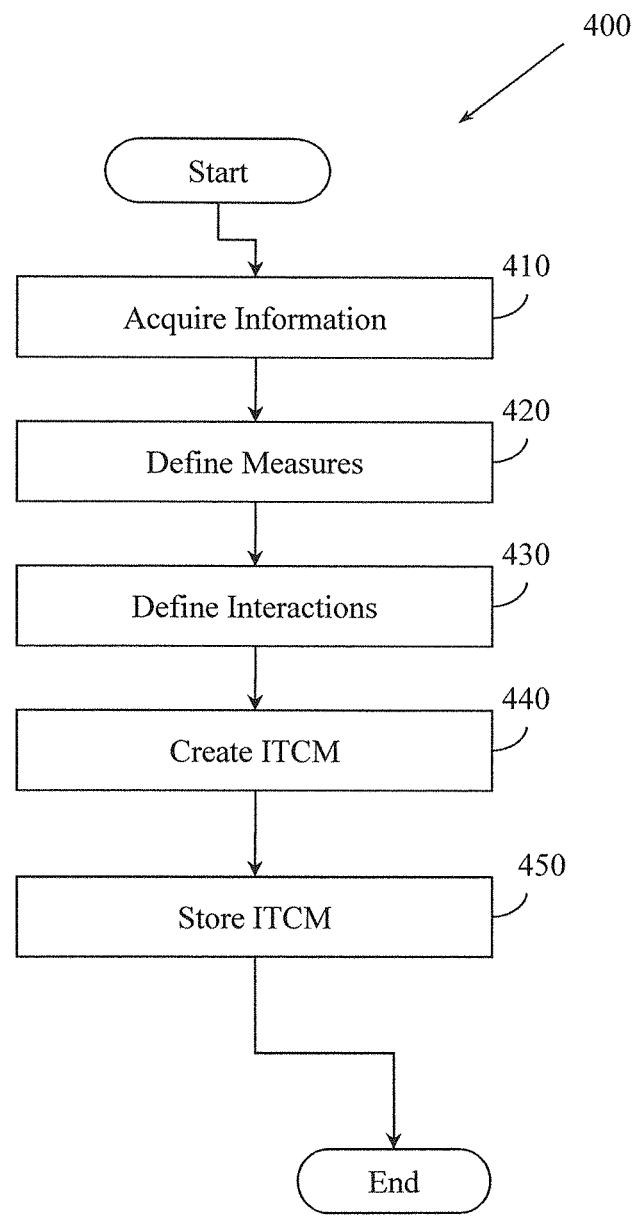
FIG. 4 illustrates an example method associated with producing an ITCM.

FIG. 4 illustrates a method 400 associated with producing an ITCM. Method 400 includes, at 410 acquiring information to be employed in producing an ITCM associated with real-time adaptive interactive speech therapy. The information may include, for example, computer animations, video, audio, text, and other data associated with other senses (e.g., touch, smell). Thus, the information may include, for example, a real-time three-dimensional animation data, a video data, a digital image, a sound encoded in different types of files (e.g., pdf, audio, wave, text), text, tactile data, an olfactory data, and so on. This information may be used in producing an immersive virtual reality into which a person interacting with the training session associated with the ITCM will enter. While seven different types of information are described, it is to be appreciated that a greater and/or lesser amount of information may be acquired and combined in different combinations. Additionally, while information associated with speech therapy is described, it is to be appreciated that in different examples information associated with other types of training and/or therapy (e.g., physical therapy) may be acquired.

Method 400 may also include, at 420, defining a set of measures to be included in the ITCM. The set of measures may include measures that facilitate assessing how a session is going, how a person is progressing, how a session may be adapted, how a therapy plan may be adapted, and so on. Thus, the measures may include, for example, an articulatory movement measure, an articulatory precision measure, a voice modulation measure, a voice resonance measure, a pacing measure, a stuttering measure, a slurring measure, a performance measure, and a comprehension measure. While nine different measures are described, it is to be appreciated that a greater and/or lesser number of measures may be defined and used in different combinations. Similarly, while speech therapy measures are described, it is to be appreciated that measures associated with other therapies (e.g., physical therapy) may be defined.

Method 400 may also include, at 430, defining a set of interactions to be included in the ITCM. The interactions may describe, for example, stimulus response pairs intended to occur between a trainee and an ITCM character, object, or event. Thus, the interactions may include, for example, a verbal exchange between a person and an ITCM character during a training session, a menu selection action undertaken by a person during a training session in response to an ITCM character or event, a graphical user interface action undertaken by a person during a training session in response to an ITCM character or event, manipulation of a physical item by a person during a training session in response to an ITCM character or event, and so on. While four interactions are described, it is to be appreciated that a greater and/or lesser number of interactions may be defined and employed in different combinations.

Method 400 also includes, at 440, creating an ITCM. Creating an ITCM may include, for example, producing an object, where object is used in its computer science term of art form. The object may include both data and methods. In another example, creating an ITCM may include populating a set of XML files and/or a set of database entries. The XML files may store information describing and/or forming a portion of the ITCM. Similarly, the database entries may store information describing and/or forming a portion of the ITCM.

Method 400 may conclude, at 450, by storing the ITCM on a computer-readable medium. The stored ITCM may include, for example, a set of nodes having content and logic, a transition logic to control transitions between nodes during a training session based, at least in part, on an interaction experienced at a node, members of the set of measures defined at 420, members of the set of interactions defined at 430, and an assessment logic to populate a member of the set of measures based, at least in part, on assessment data acquired during an interaction in a training session.

Figure 5:
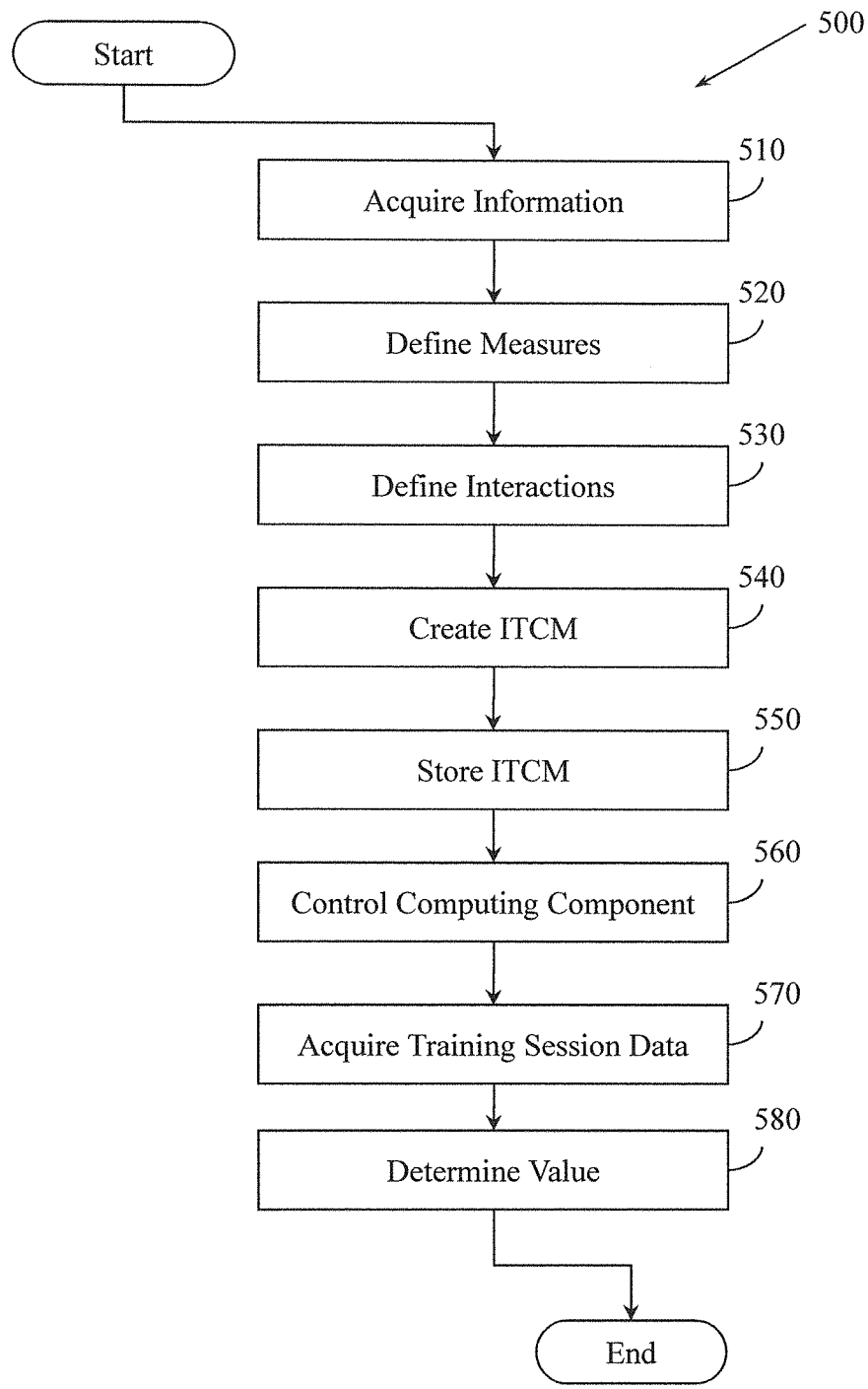
FIG. 5 illustrates an example method associated with producing and using an ITCM.

FIG. 5 illustrates a method 500 having several actions similar to those disclosed in connection with method 400 (FIG. 4). For example, method 500 includes acquiring information at 510, defining measures at 520, defining interactions at 530, creating an ITCM at 540, and storing the ITCM at 550. However, method 500 includes additional actions.

Method 500 includes, at 560, controlling a computing component to initiate a training session associated with the ITCM. The controlling at 560 may include, for example, sending a signal to a computer to load and run an ITCM. The controlling at 560 may also include, for example, sending a signal to an operating system to load an run an ITCM. While two signaling methods are described, it is to be appreciated that the control at 560 may be exercised in different manners. In one example, actions 510 through 550 may be replaced with a single action of accessing a stored ITCM. Thus, not every training session requires the creation of a new ITCM and stored ITCMs may be re-used.

Method 500 also includes, at 570, acquiring training session data during the training session. The training session data may include data acquired from a person immersed in the training session, from a person observing the training session, from interactions experienced during the training session, and so on. Thus, the training session data may include, for example, a response, a response time, heart rate data, skin temperature data, galvanic skin response (GSR) data, electro-cardiogram (EKG) data, electro-encephalogram (EEG) data, pupil dilation data, eye contact data, facial expression data, posture data, gestural data, intonation data, therapist impression data, speech performance data, physiological bio-feedback, behavioral non-verbal bio-feedback, and performance evaluation data. While several types and instances of training session data are described, it is to be appreciated that some training sessions may include a greater and/or lesser numbers and types of training session data.

Method 500 may also include, at 580, determining a value for a member of the set of measures based, at least in part, on a member(s) of the training session data. The value may be written into a computer memory location associated with the member, may be written to a computer-readable medium, may be displayed on a computer display, and so on. The value may be used, as illustrated in method 600 (FIG. 6), to adapt a training session.

Figure 6:
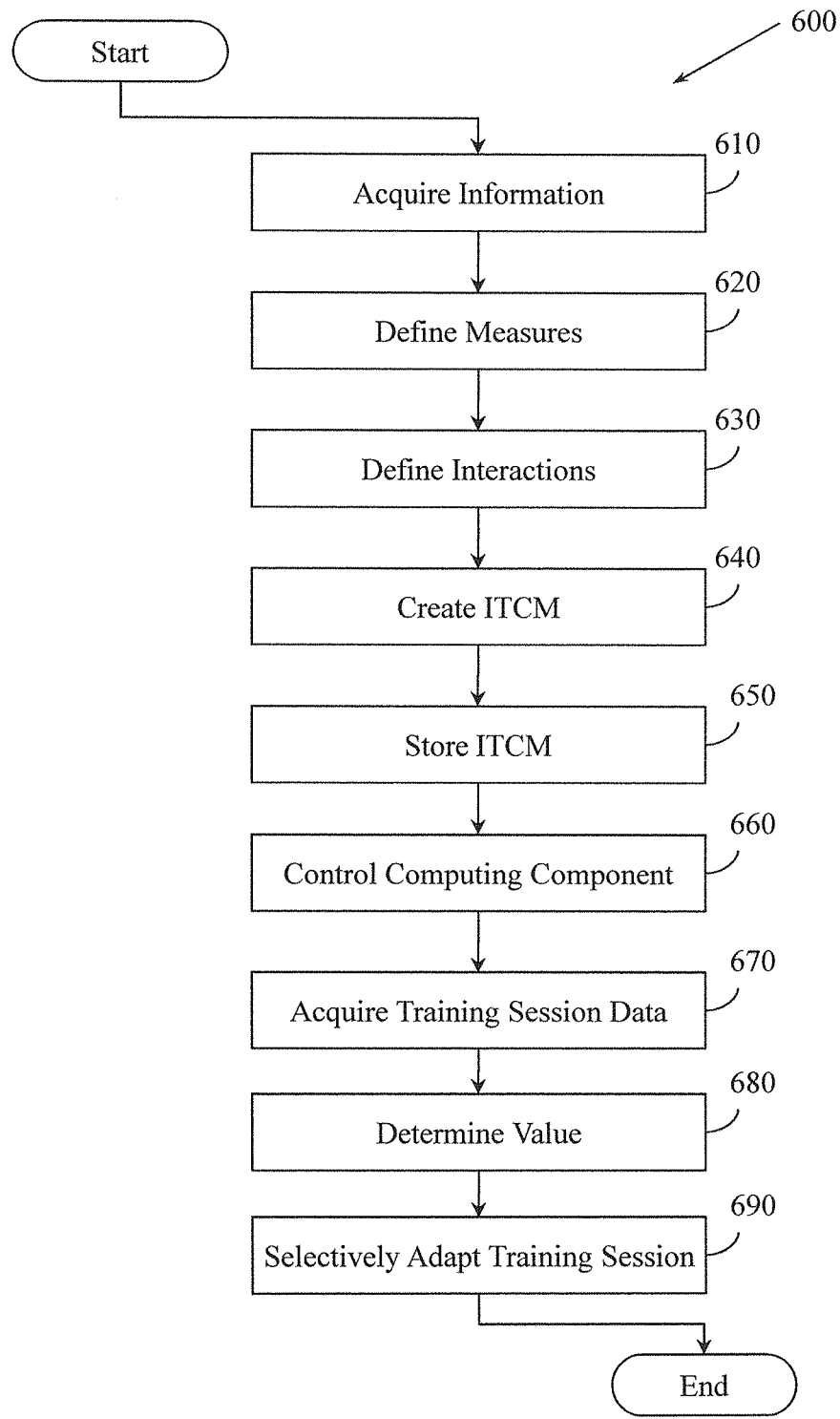
FIG. 6 illustrates an example method associated with producing and using an ITCM.

FIG. 6 illustrates a method 600 having several actions similar to those disclosed in connection with method 500 (FIG. 5). For example, method 600 includes acquiring information at 610, defining measures at 620, defining interactions at 630, creating an ITCM at 640, storing the ITCM at 650, controlling a computer component at 660, acquiring training session data at 670, and determining a value for a measure at 680. Like method 500, in one example, method 600 may also replace actions 610 through 650 with the single action of accessing a stored ITCM. Similarly, method 600 includes an additional action.

Method 600 includes, at 690, selectively adapting a training session parameter based, at least in part, on the training session data. The adapting at 690 may include adapting parameters including, but not limited to, a number of distractions in a training session, a type of distraction in a training session, a number of stressors in a training session, a type of stressor in a training session, a complexity associated with a training session, a volume associated with a training session, a pace associated with a training session, a proximity of a character associated with a training session, a degree of friendliness of a character associated with a training session, and a degree of animation of a character associated with a training session. The adaptation may be based on different types of inputs (e.g., signals). For example, the adaptation may be based on an operator signal, a signal provided by an AI logic, a combination of these signals, and so on. While three types of signals are described, it is to be appreciated that a greater and/or lesser number of signals and that signals of different types may be employed.

Figure 7:
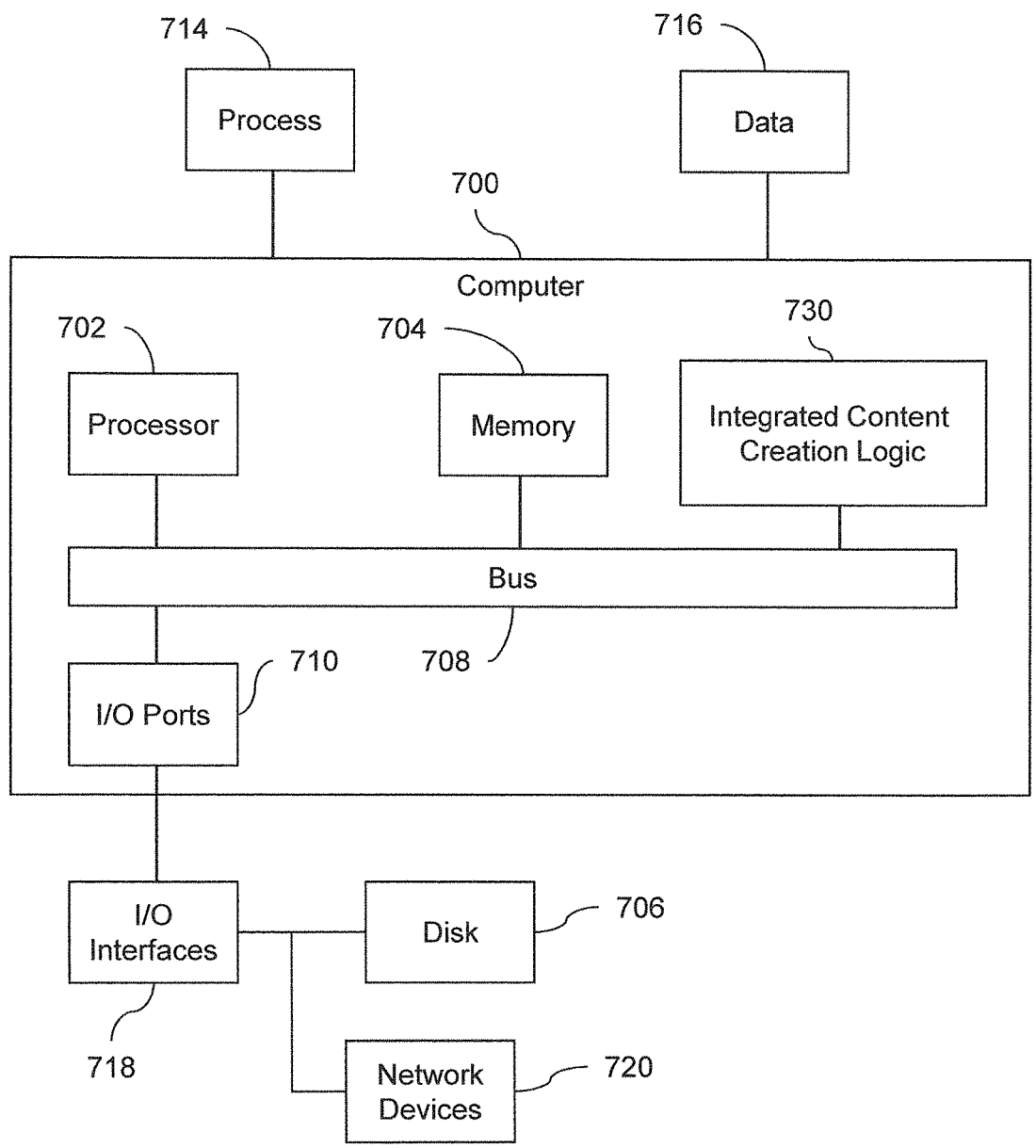
FIG. 7 illustrates an example computing device in which example systems and methods may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include an integrated content creation logic 730 configured to facilitate producing an ITCM associated with a real time adaptive interactive automated speech therapy session. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

Thus, logic 730 may provide means (e.g., hardware, software, firmware) for acquiring information to be employed in producing the ITCM. The means may be implemented, for example, as an ASIC programmed to acquire information from, for example, a real-time three-dimensional computer animation device, sound devices, video devices, and so on. The means may also be implemented as computer executable instructions that are presented to computer 700 as data 716 that are temporarily stored in memory 704 and then executed by processor 702. Logic 730 may also provide means (e.g., hardware, software, firmware) for producing the ITCM and for storing the ITCM on a computer-readable medium.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A bio-feedback responsive training system, comprising:
    a bio-feedback sensor structured to measure bio-feedback corresponding to physical or behavioral non-verbal characteristics of a user;
    a training device comprising:
        a display screen,
        a non-transitory computer readable medium structured to store a plurality of instructions, and
        a microprocessor structured to execute the plurality of instructions,
    wherein the plurality of instructions are structured to be executed by the microprocessor effective to:
    generate an avatar using a set of information to portray a communication disorder by rendering the avatar on the display screen;
    receive a set of real-time bio-feedback measurements from the bio-feedback sensor;
    adapt, in real-time, the avatar rendered on the display screen in response to the real-time bio-feedback measurements;
    define a set of nodes, using an electronic data object, corresponding to actions indicative of the communication disorder that are selectively performed by the avatar as rendered on the display screen;
    electronically populate electronic measures associated with the set of nodes with values that correspond to diagnostic tools selected according to an electronic input by the user to analyze the actions performed by the avatar;
    transition between nodes of the set of nodes based, at least in part, on the values of the electronic input selected by the user in response to the adapted avatar as rendered on the display screen so as to provide adaptive training to the user according to the selected values and the real-time bio-feedback measurements, and where each of the set of nodes causes the avatar to perform different actions; and electronically generate and assign a score to the values of the electronic input selected by the user to evaluate a training competency of the user in identifying the communication disorder.

2. The system of claim 1, where the set of nodes are defined to form a graph type of electronic data structure.

3. The system of claim 1, where the electronic input specifies a value in response to a selection of one of the diagnostic tools by the user through a graphical user interface (GUI).

4. The system of claim 1, where the score is a function of a metric used to evaluate the values selected when traversing nodes by the user.

5. The system of claim 1, where generating the avatar to portray the communication disorder includes generating the avatar with an articulatory movement, an articulatory precision, voice modulation, voice resonance, pacing, stuttering, slurring, autism characteristics, selective mutism characteristics, aphasia characteristics, language learning disabilities, cognitive/mental challenges, or a comprehension measure associated with the communication disorder.

6. The system of claim 1, where the training device is configured to transition to a different node based, at least in part, on an amount of time for the user to select the value of the plurality of values.

7. The system of claim 1, where the display screen is structured to render the avatar in a setting including one of a higher education setting, an allied health professional setting, a hostage negotiation setting, an occupational therapy setting, or a physical therapy setting.

8. A speech therapy training system comprising:
a heart rate monitor structured to measure a real-time heart rate of a user;
a training device comprising:
a display;
a non-transitory computer-readable medium configured to store a set of instructions, and
a microprocessor structured to receive the set of instructions and execute the set of instructions to as to:
electronically generate an avatar to portray a communication disorder by electronically rendering the avatar on the display;
update the rendered avatar in real-time in response to the real-time heart rate measurements measured by the heart rate monitor;
define a set of nodes corresponding to actions indicative of the communication disorder that are selectively performed by the avatar, where defining the set of nodes includes defining the set of nodes by generating an electronic data object with node elements that correspond with the actions;
electronically populate measures associated with the set of nodes with values that correspond to diagnostic tools specified by an electronic input selected by a user in response to analyzing the actions performed by the avatar, where the measures are electronic data structures that store the electronic input and are electronically associated with the set of nodes;
transition between nodes based, at least in part, on the values selected by the user in response to the actions of the avatar and the real-time heart rate measurements, where transitioning between the nodes provides adaptive training to the user according to the selected values and the real-time heart rate measurements by causing the avatar to be rendered portraying different actions according to the set of nodes; and
electronically generate and assign a score to the values of the electronic input selected by the user to evaluate a training competency of the user in identifying the communication disorder.

9. The system of claim 8, where the set of nodes are defined to form a graph type of electronic data structure.

10. The system of claim 8, where a value is electronically generated and stored in one of the measures in response to the electronic input provided upon the user selecting one of the diagnostic tools, where the measures are electronic data structures that correlate with actions of the user.

11. The system of claim 8, where the score is a function of a metric to evaluate the values selected when traversing set of nodes.

12. The system of claim 8, where generating the score is a function of an amount of time that a user takes to select a value.

13. The system of claim 8, where generating the avatar to portray the communication disorder includes generating the avatar with an articulatory movement, an articulatory precision, voice modulation, voice resonance, pacing, stuttering, slurring, autism characteristics, selective mutism characteristics, aphasia characteristics, language-learning disabilities, cognitive/mental challenges and a comprehension measure associated with the communication disorder.

14. The system of claim 8, where the display screen is structured to render the avatar in a setting including one of a higher education setting, an allied health professional setting, a hostage negotiation setting, an occupational therapy setting, or a physical therapy setting.

15. A communication disorder diagnosis trainer comprising:
a bio-feedback sensor structured to measure, in real-time, a behavioral non-verbal characteristic of a user;
a computer including:
an electronic display;
a non-transitory computer-readable medium structured to store a set of instructions; and
a processor in communication with the non-transitory storage readable medium and the biofeedback sensor, the processor being structured to execute the set of instructions,
wherein the set of instructions, when executed by the processor, are structured to:
electronically generate an avatar to portray a communication disorder by rendering the avatar on the electronic display according to at least one or more gestures that are indicative of the communication disorder;
update the avatar rendered on the electronic display in real-time using the measurements received from the bio-feedback sensor;
define a set of nodes in an electronic data structure corresponding to actions indicative of the communication disorder that are selectively performed by the avatar, where defining the set of nodes includes defining the set of nodes using an electronic data object;
electronically populate measures associated with the set of nodes with values provided via an electronic input that corresponds to diagnostic tools selected by a user in response to analyzing the actions performed by the avatar;
electronically transition between nodes based, at least in part, on the values selected by the user and received as the electronic input in response to the actions of the avatar rendered using the measurements received from the bio-feedback sensor, where transitioning between the nodes provides adaptive training to the user according to the selected values by causing the avatar to be rendered portraying different actions as defined within the set of nodes; and electronically generate and assign a score to the values selected by the user to evaluate a training competency of the user in identifying the communication disorder portrayed by the avatar.

\* \* \* \* \*